July 26, 1960  R. R. PARKS ET AL  2,946,869
SAFETY STEERING WHEEL AND HORN BLOWING MEANS
Filed June 6, 1958  4 Sheets-Sheet 2

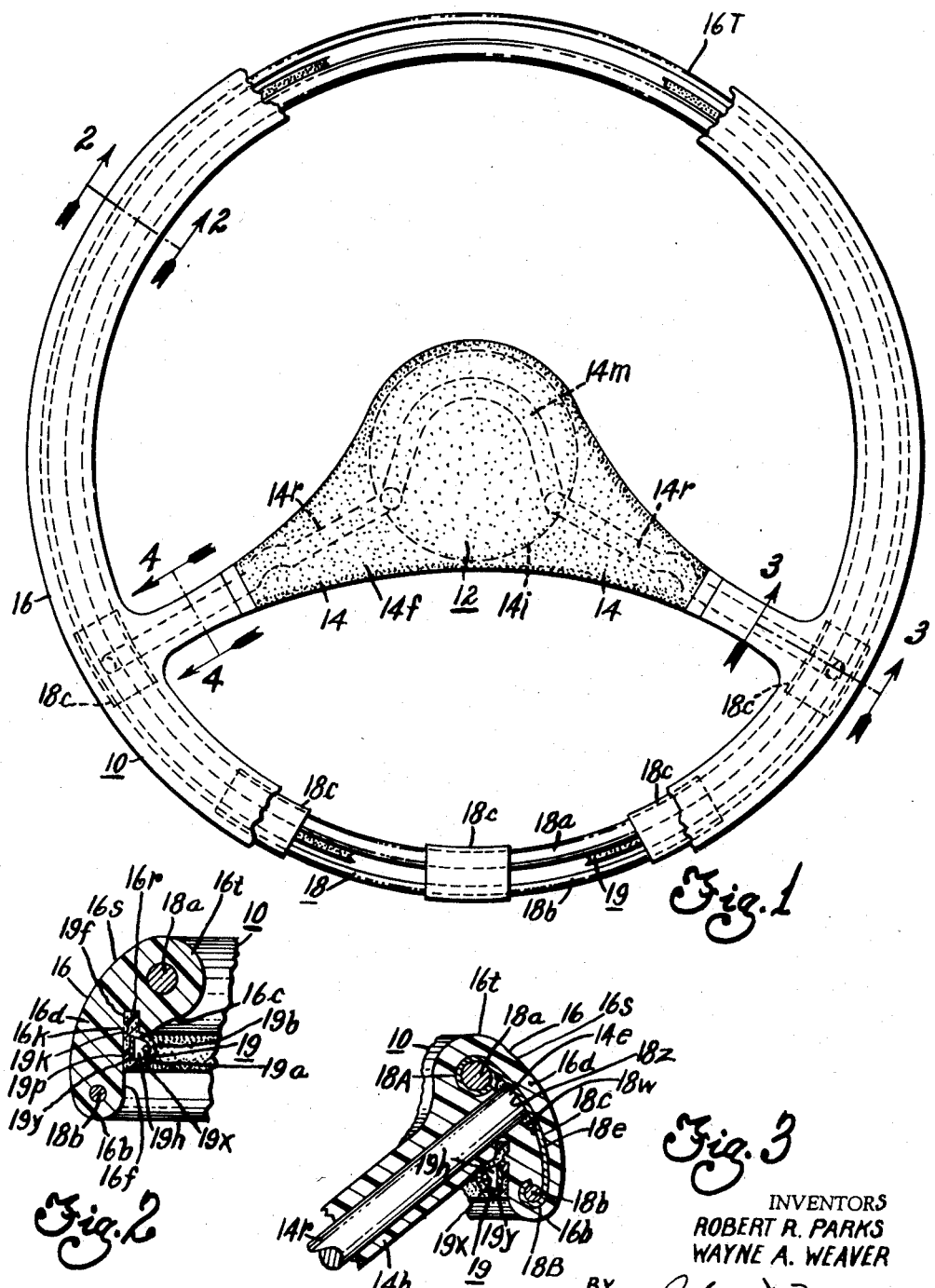

INVENTORS
ROBERT R. PARKS
WAYNE A. WEAVER
BY John T. Marvin
THEIR ATTORNEY

July 26, 1960  R. R. PARKS ET AL  2,946,869
SAFETY STEERING WHEEL AND HORN BLOWING MEANS
Filed June 6, 1958  4 Sheets-Sheet 3

INVENTORS
ROBERT R. PARKS
WAYNE A. WEAVER
BY John T. Marvin
THEIR ATTORNEY

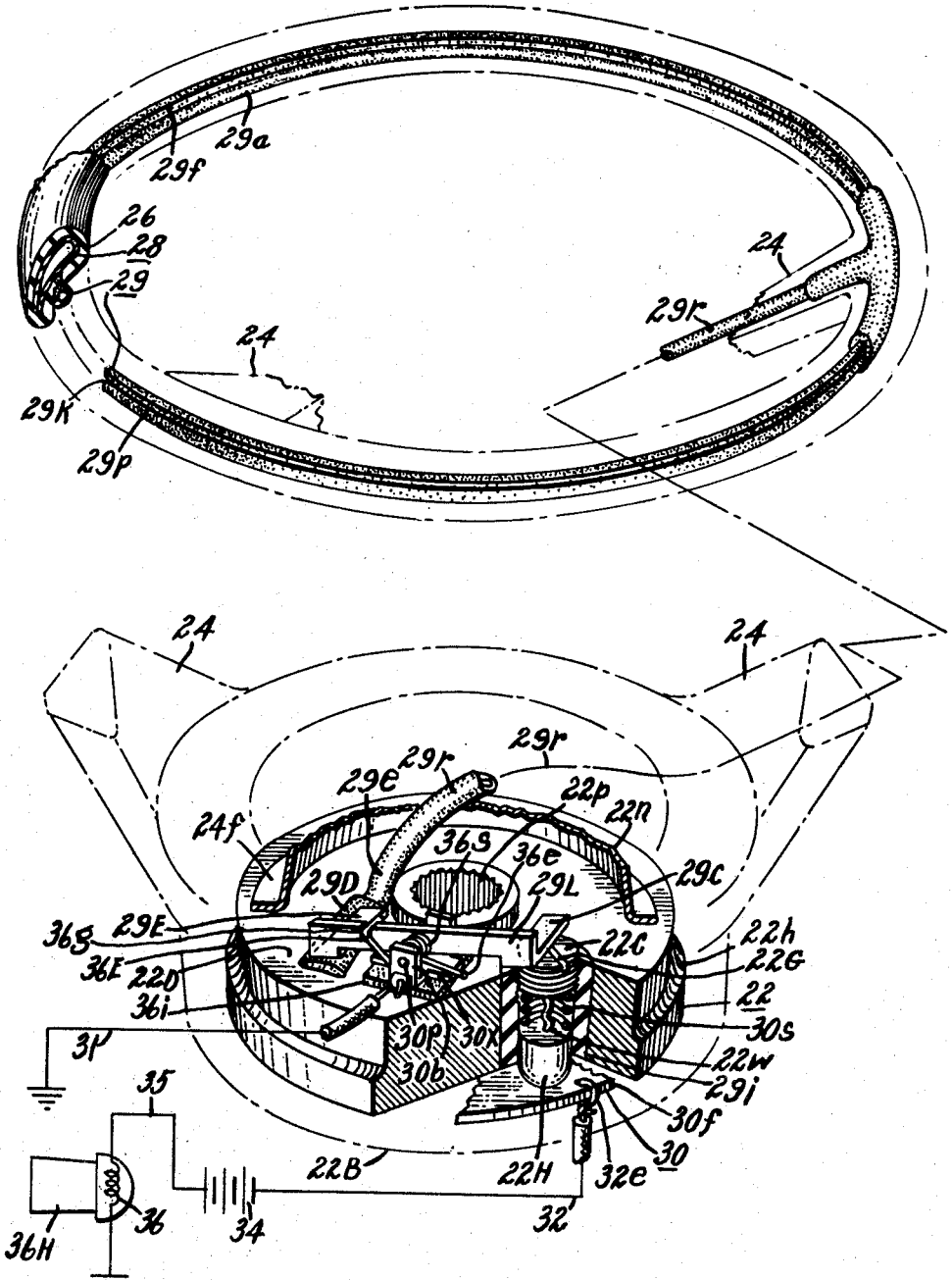

United States Patent Office 2,946,869
Patented July 26, 1960

2,946,869
SAFETY STEERING WHEEL AND HORN BLOWING MEANS

Robert R. Parks, Madison Heights, and Wayne A. Weaver, Detroit, Mich., assignors to General Motors Corporation, Detroit, Mich., a corporation of Delaware Filed June 6, 1958, Ser. No. 740,475

6 Claims. (Cl. 200—61.57)

This invention relates to a safety steering wheel and horn blowing means, and particularly, to steering wheel and horn blowing mechanism featuring elimination of possible sources of injury and elimination of possible glare or obstruction to vision of individuals in the environment thereof.

An object of this invention is to provide a new and improved steering wheel and horn blowing means for a vehicle.

Another object of this invention is to provide a safety steering wheel and horn blowing means having flexible material peripherally located adjacent to the steering wheel on one side thereof and having the flexible material adapted for use in a horn actuation system.

Another object of this invention is to provide a horn blowing mechanism including a flexible material forming part of a fluid system provided extending at least partially circumferentially relative to the steering wheel and having a terminus portion adapted to be expandable due to increase of fluid pressure for actuating a horn blowing electrical circuit having a contact portion located adjacent to a hub of the steering wheel.

Another object of this invention is to provide a horn blowing mechanism including a flexible material carrying a pair of electrical conductors spaced from each other and exposed opposite to each other for forming part of an electrical system provided extending at least partially circumferentially relative to the steering wheel and having the electrical system located adjacent to a hub of the steering wheel while the electrical system circuitry can be closed to excite and blow the horn by exertion of pressure for bridging the electrical conductors substantially anywhere peripherally about the steering wheel where the flexible material is provided.

Another object of this invention is to provide a steering wheel having a rim portion in which at least two annular rods are imbedded and having bracket means interconnecting the rods at least adjacent to one peripheral portion of the steering wheel rim where radial members of the steering wheel are attachable between the rim portion and a wheel hub.

A further object of this invention is to provide a steering wheel having a rim provided with annular reinforcing means having one portion of less diameter than another portion of the annular means with curved-metal portions interconnecting the different diameter portions and providing a concave underside of the rim where an annular horn-actuating flexible material is located intermediate the different diameter portions and is adapted to be squeezable by an operator's fingers and/or hands which remain on the rim because a vision-obstructing and metallic-glare-producing horn ring is eliminated for safety and also for permitting a resilient crash-pad-type material to be provided covering a hub portion and/or radial members between the hub portion and rim of the steering wheel.

Further objects and advantages of the present invention will be apparent from the drawings wherein preferred embodiments of the present invention will be shown.

In the drawings:

Figure 1 is a plan view of a steering wheel and horn blowing means in accordance with the present invention.

Figure 2 is a fragmentary cross sectional view taken along line 2—2 of Fig. 1.

Figure 3 is a fragmentary cross sectional view taken along line 3—3 in Fig. 1.

Figure 9 is a schematic diagram of a horn actuating fluid system provided for steering wheel means in accordance with the present invention.

Figure 5:
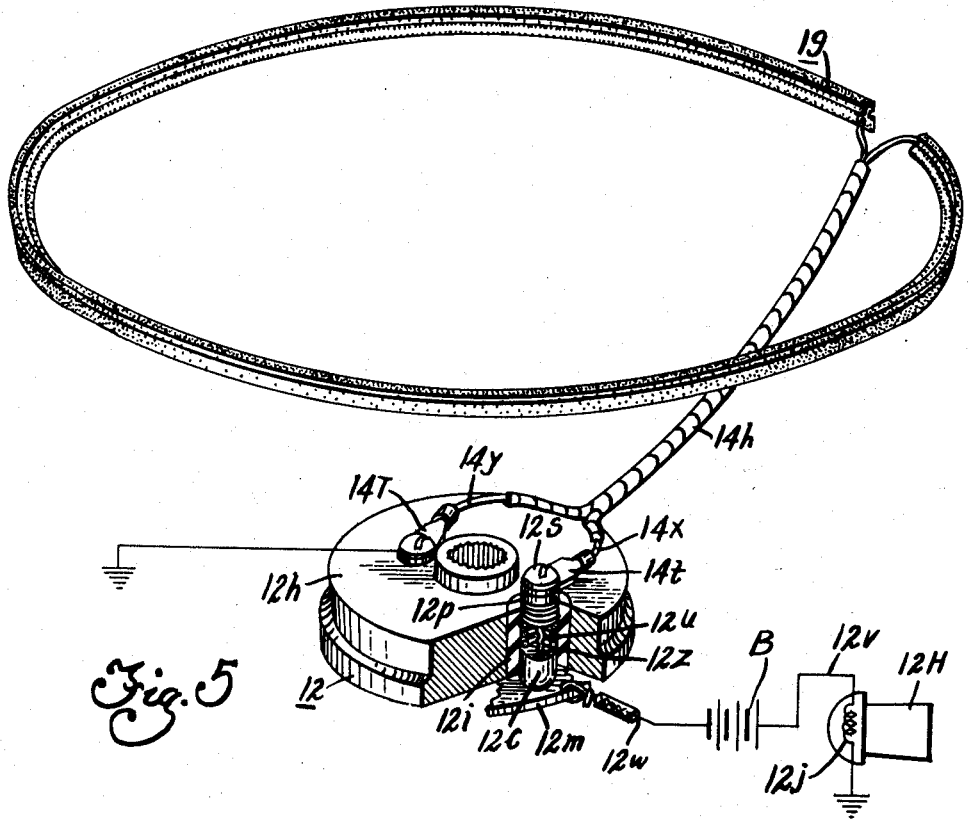
Figure 5 is a schematic diagram of an electrical horn blowing system provided for the steering wheel means of Figures 1–4.

With particular reference to Fig. 1, there is shown a steering wheel generally indicated by numeral 10 and having a hub portion 12 connected by radial members or spokes 14 to a rim portion 16. The rim portion has an annular shape that is maintained by an annular reinforcing means generally indicated by numeral 18. The reinforcing means 18 includes a pair of annular rings or wire rim members 18a and 18b interconnected or maintained in spaced relation relative to each other by a bracket means 18c. The ring 18a is referred to as an outer rim relative to the hub and having a cross-sectional diameter substantially twice the cross-sectional diameter of the inner rim 18b. Difference in thickness or cross-sectional diameters of rings 18a and 18b can be best seen in Figures 2 and 3 wherein the steering wheel 10 of the embodiment of the present invention shown in Fig. 1 is shown in further detail.

As shown in Fig. 2, the outer rim 18a is located adjacent to a top section 16t of the annular portion 16 of the steering wheel and it is the outer rim 18a which is adjacent to an operator of a vehicle in which the steering wheel is installed in a usual manner relative to a steering post provided extending into a passenger compartment of a vehicle. The inner rim 18b is located remote from the operator of a vehicle and is provided adjacent to a bottom portion 16b of the annular steering wheel portion 16. Since the overall diameter of the outer and thicker rim 18a is substantially less than the overall diameter of the thinner inner rim 18b, the annular steering wheel portion 16 in accordance with the present invention is formed to extend longitudinally and laterally outwardly from the outer rim 18a relative to the inner rim 18b. Preferably a resilient material or semi-rigid plastic-type material is used for forming an annular body section 16d extending between the inner and outer rims of wire or metal imbedded therein. Due to the larger cross sectional diameter of the outer rim 18a, the annular portion of the steering wheel adjacent to the top 16t of the steering wheel is thicker and larger in diameter or cross section that the smaller and narrower bottom section 16d surrounding the smaller cross-sectional diameter inner rim 18b. The insulating material or plastic type body section 16d of rim portion 16 of the steering wheel has an outer convex surface 16s which is curved longitudinally and laterally in a radially outward direction and is complementary to a substantially concave surface 16c formed extending about an inner periphery of the rim body portion of the steering wheel. The concave surface 16c extends from the top section 16t to the bottom section 16b of the annular body of the steering wheel and a groove or recess 16r is provided extending inwardly from the concave surface 16c into the body section 16d of the steering wheel. The recess 16r extends in a longitudinal direction which is at right angles or normal to a radius of the rings or rims 18a and 18b. Preferably, the recess 16r extends toward the thicker top section 16t of the annular body and a lip or radially extending key 16k is provided extending into the recess 16r as shown in Fig. 2.

In accordance with the present invention, an annular tubular means generally indicated by numeral 19 is provided to be fitted relative to the recess 16r adjacent to the concave surface 16c of the steering wheel body portion. This tubular means includes an annular hollow body member 19b having a laterally extending flange portion 19f that extends outwardly from the body member 19b and that is provided with a complementary key portion or groove 19k located adjacent to and relative to the key portion 16k of the steering wheel body portion. It is to be understood that the outwardly protruding key portion 16k can be a groove in the annular body portion of the steering wheel and that the key portion 19k of the annular means 19 can be an outwardly protruding key so that means for interlocking the steering wheel body portion and the annular tubular means 19 are formed for locking engagement of the tubular means relative to the steering wheel body portion. The body or rim portion of the steering wheel has a flat surface 16f extending along one side of the recess 16r and a flat annular periphery 19p is provided for the tubular means 19 that is complementary to the flat surface of the body portion of the steering wheel. A curved semi-annular portion 19a of the tubular means body 19b lies exposed between the concave surface 16c and flat surface 16f on the radially inner side of the steering wheel annular rim portion 16. The tubular means 19 is provided as part of a horn blowing means and also as part of a safety steering wheel. Generally, horn blowing means are formed by having an annular metallic horn ring provided in space intermediate the steering wheel hub 12 and the annular body portion 16 of the steering wheel. There have also been horn blowing means provided adjacent to a top body portion such as 16t of the annular steering wheel means. In accordance with the present invention, a flexible non-metallic plastic material such as polyethylene tubing or the like is used to form the horn ring tube 19. The flange 19f of the horn ring tubular means is locked into engagement relative to the recess 16r of the annular steering wheel rim portion and cement can be applied between adjacent surfaces between the flange 19f and recess 16r for supplementing locking action of the key means 16k—19k.

The body 19b of the horn ring tube is provided with a hollow interior 19h and a conducting means such as an annular wire member 19x and an annular ring member or plate 19y of slightly greater overall diameter than wire 19x can be provided and attached to the tubular body within the hollow portion 19h. The conducting means or annular metallic members 19x and 19y are spaced radially relative to each other and are carried by the inner surfaces of the body 19b of the flexible material used for the tubular means 19. Since the annular portion 16 of the steering wheel is contoured having a convex surface 16s and a concave surface 16c, an operator can place his hands conveniently around the annular body or rim portion 16 of the steering wheel and fingers or a palm of a hand can be curled around the top section 16t and around the bottom section 16b for firmly gripping the annular steering wheel body or rim portion. The fingers in this position are closely adjacent to the horn ring tubular means 19 and application of pressure relative to the arcuate or semi-circular portion 19a of the body 19b results in dispalcement of the annular conducting means 19x to a radially outer position causing contacting of the conducting material 19y relative to the conducting material 19x for effecting horn blowing actuation as will be described in further detail below.

Fig. 3 is a fragmentary cross sectional view taken along line 3—3 in Fig. 1 for illustrating in further detail how the steering wheel and horn blowing means of the present invention are constructed. The annular body or rim portion 16 of the steering wheel is reinforced by the outer rim or ring 18a and inner rim or ring 18b which are interconnected by the clip or bracket means 18c. The bracket means 18c includes a convex, outwardly-curved body portion 18e that is imbedded in the insulating or resilient material of body section 16d forming the steering wheel. Each clip or bracket means is provided with annular or curved segments that are bent around the rims or rings 18a and 18b. This structure is best seen in the fragmentary cross sectional view of Fig. 3. A curved end 18A is wrapped tightly around the larger cross-sectional diameter metal ring 18a and a curved end 18B is wrapped around the smaller cross-sectional diameter ring 18b. Since the wrap-around curved ends 18A and 18B extend substantially around the periphery of each of the rings 18a and 18b, the clip or bracket means 18c serve for maintaining spaced relationship at a predetermined distance between the inner and outer annular rings. As visible in Fig. 1 a plurality of these clips 18c is provided between the rings 18a and 18b around only a short or lower peripheral portion of the annular body or rim portion 16 and this arcuate distance lies between spokes 14 that extend from the hub portion 12 to the annular body or rim portion 16. Preferably the top peripheral annular portion 16T of the annular body or rim portion 16 of the steering wheel is not provided with bracket means or clips 18c. Thus the top annular portions of the rings 18a and 18b imbedded in the insulating material are free and resilient relative to the spokes 14. In the event of a severe impact or collision causing forward movement of an operator against the steering wheel, the top peripheral annular portion 16T of the steering wheel can be bent and is resilient relative to the spokes so that injury can be kept to a minimum due to the flexibility of the separate metal rings 18a and 18b imbedded in the body or rim portion of the steering wheel. Since a plurality of clips 18c can be provided in a lower arcuate portion of the steering wheel, the rings 18a and 18b are maintained substantially in alignment relative to each other.

As best seen in Fig. 3, a radial means or rod 14r is imbedded in a plastic or hard rubber spoke body portion 14b extending radially between the hub 12 and annular body or rim portion 16 of the steering wheel. A radially outer end 14e of the rod 14r abuts against a concave inner surface 18z of the clip or bracket means 18c and a weld or butt weld line 18w is provided to join the end of the rod 14r relative to the bracket means or clip 18c. This butt welded juncture of the rod 14r relative to the clip 18c is formed adjacent to and closer to the larger cross-sectional diameter outer ring 18a as illustrated in Fig. 3. The purpose of forming this butt weld juncture adjacent to the larger ring 18a is to enhance the strength of the steering wheel body portion by forming a more rigid support of the rod 14r relative to the clip 18c adjacent to the larger cross-sectional diameter ring 18a. Also the butt weld juncture is formed closer to the larger cross-sectional diameter ring 18a so that the smaller cross-sectional diameter inner ring 18b is spaced further away from the radial rods 14r and there is more space for providing the recess 16r in which the flange 19f is secured for maintaining the tubular means 19 relative to the concave surface 16c and flat surface 16f of the steering wheel annular body portion.

The tubular means 19 and conducting portions 19x and 19y provided in the hollow interior 19h of the tubular horn ring blowing means can be seen in Figures 2 and 3. The tubular means 19 can be made of rubber-like material extruded to include a hollow interior with inner opposite walls in which wire or conducting portions 19x and 19y can be imbedded during extrusion thereof. The spokes of the steering wheel as reinforced by the radial rods 14r are provided with a radially inner portion 14i which is covered by a resilient foamed material 14f molded in a crash pad type covering for the central or hub portion 12 of the steering wheel shown in Fig. 1. This central padding of foamed resilient material will be described in further detail below.

Figure 4:
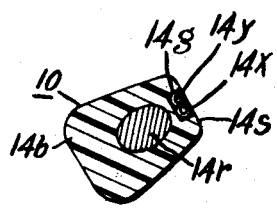
Figure 4 is a cross sectional view taken along line 4—4 in Fig. 1.

Fig. 4 is a fragmentary cross sectional view taken along line 4—4 of Fig. 1 and there is shown in Fig. 4 a cross section of the rod 14r imbedded in the resilient material 14b that is formed or molded together with the annular rim or body portion of the steering wheel. The body portion 14b of the spokes is provided with a groove 14g extending inwardly from a bottom surface 14s of one spoke and this groove is spaced from and substantially parallel to the radial rod 14r in this spoke. Placed into the groove 14g there is a pair of insulated conductors or wires 14x and 14y which can be connected in any suitable manner to the annular conducting material 19x and 19y carried inside the hollow portion 19h of the horn blowing tubular means 19. The wires 14x and 14y can be wrapped with a suitable insulating tape to form a harness 14h for a circuit indicated schematically in Fig. 5 which illustrates a horn blowing mechanism in accordance with the present invention. The wire 14x carries a terminal 14t and the wire 14y carries a terminal 14T. Preferably the terminal 14T is connected to ground as indicated schematically in Fig. 5. This can be accomplished by connecting the wire 14y and terminal 14T directly to an annular hub member 12h that is in contact with a steering column or any other metal member which is grounded to a chassis or other ground portion of a vehicle electrical circuit. The terminal 14t connects the wire 14x to a contact pin 12p which is provided in an insulating material sleeve 12i inserted in a passage of hub member 12h and which is preferably attached by a screw 12s to the terminal 14t.

A cylindrical contact member 12c is reciprocable relative to a hollow interior of the insulating sleeve 12i and is biased away from the contact pin 12p by a spring 12u inserted between one end of the contact pin 12p and the cylindrical contact member 12c. A flexible lead 12z can be provided to interconnect pin 12p and member 12c. The end of the cylindrical contact 12c opposite the spring engaged end thereof is in electrical engagement with an arcuate conductor or contact means 12m which is connected through a suitable conductor or lead-in wire 12w to a source of electrical power or battery B which in turn is connected by a wire 12v to a solenoid 12j of a horn 12H. The solenoid 12j is connected to ground in a usual manner and is effective in energizing a diaphragm or other horn blowing structure provided in the horn 12H. The circuit through the battery B to the solenoid 12j relative to ground connection is closed only when the horn blowing tube 19 is compressed by pressure exerted such as by fingertips causing engagement of conducting elements 19y and 19x relative to each other for closing the electrical circuit to effect horn blowing actuation in accordance with the present invention.

As indicated schematically in Fig. 5, the horn blowing tube means 19 preferably should extend substantially 360° along the arcuate body or rim portion of the steering wheel. If desired, a semi-arcuate horn blowing tubular means can be provided extending only a portion of the periphery of the under side of the body or rim portion 16 of the steering wheel. However, to permit horn actuation anywhere as the steering wheel is turned, it is preferable that a substantially 360° tubular means 19 is provided with the steering wheel of the present invention. The reinforcing rods 14r of each of the spokes 14 are connected relative to each other by an intermediate or semi-annular median portion 14m which is suitably attached or press-fitted into engagement relative to the hub of the steering wheel.

Figure 6:
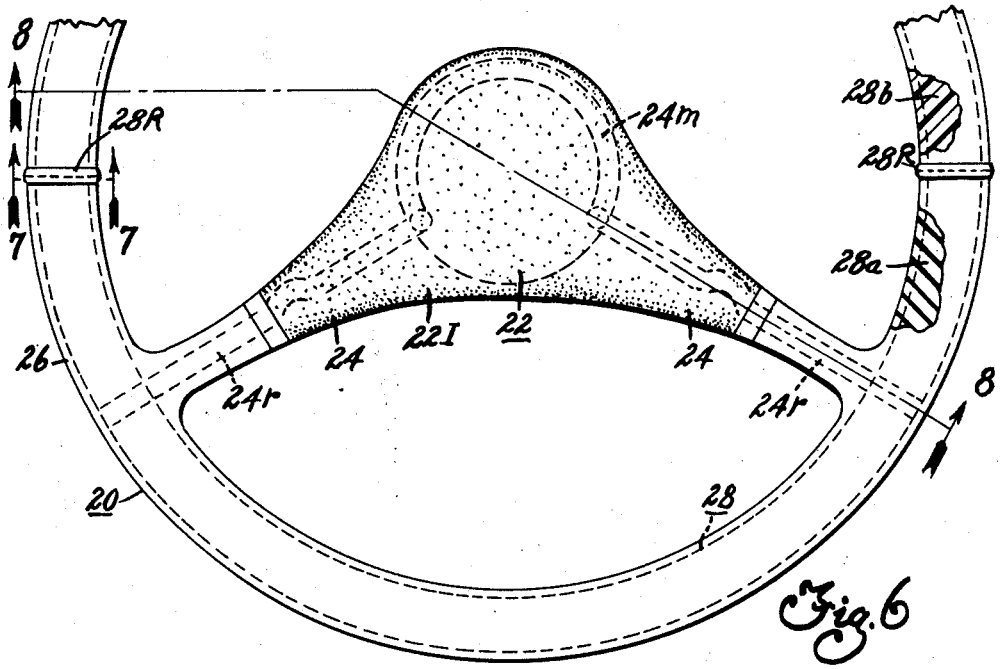
Figure 6 is a fragmentary plan view of a steering wheel and horn blowing means also in accordance with the present invention.

Fig. 6 is a fragmentary plan view of a steering wheel and horn blowing means also in accordance with the present invention. The steering wheel is indicated generally by numeral 20 and includes a hub portion 22 connected by means of spokes 24 to an annular wheel or rim body portion 26. The hub 22 is suitably attached to a steering column of the vehicle and a reinforcing means is provided for the spokes. The reinforcing means includes a pair of radial rods 24r which are imbedded in a resilient material covering. An intermediate portion 24m of the reinforcing means interconnects the rod portions 24r. The intermediate portion 24m of this reinforcing means is used for connecting the steering wheel relative to a hub portion thereof as will be more fully seen in Fig. 8. The steering wheel of Fig. 6 differs from the steering wheel of Fig. 1 in that an annular reinforcing means generally indicated by numeral 28 is provided inside the annular body or rim portion 26 of the steering wheel and in that this annular reinforcing means 28 is formed of a unitary sheet metal means formed as a hollow reinforcing member for use inside the annular body portion 26 of the steering wheel. The steering wheel rim portion 26 includes a hard rubber or relatively rigid portion 28a and a soft rubber or relatively plastic portion 28b each of which are carried on the unitary hollow reinforcing means 28.

A cross sectional view taken along line 7—7 of Fig. 6 illustrates a wheel trim ring and a method of applying the trim ring for use in separating relatively soft and rigid portions of the steering wheel from each other. As mentioned in the description of Fig. 6, there is a soft rubber and a hard rubber portion of the covering carried on the reinforcing member 28. Generally there is a predetermined amount of flash or waste material protruding along abutting edges of portions of steering wheel coverings molded from different materials. This flash or waste is generally rough along the surface of the steering wheel and also is unsightly if permitted to remain or to exist at all. A trim ring is indicated by numeral 28r in Fig. 7 and includes a U-shaped body portion 28u having a semi-annular outer peripheral surface 28s that is adapted to be substantially in alignment with an outer surface of the annular body portion 26 of the steering wheel. At most, the surface 28s extends a fraction of an inch above the surface of the annular portion of the steering wheel and serves as a trim member for decorative purposes and for separating the hard and soft rubber materials, for example, that may be used along the periphery of the annular steering wheel. The U-shaped trim ring is applied by pressing the U-shaped body portion 28u into a location along the juncture of differing materials used for covering the reinforcing member 28. Along this juncture a groove can be provided prior to forcing the trim ring on the rim portion 26 or a depression can be forced to occur as the ring is forced onto the rim portion 26. Opposite ends 28e and 28E of the U-shaped body portion 28u of the trim ring are projected to locations substantially intermediate the cross sectional portion or central section of the reinforcing member 28.

Figure 7:
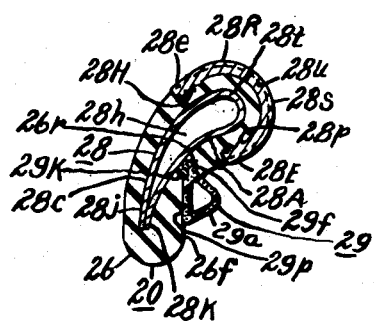
Figure 7 is a fragmentary cross-sectional view taken along line 7—7 of Fig. 6.

As visible in Fig. 7 the reinforcing member 28 has a hollow portion 28h and is formed by a unitary sheet metal member which has a curved top portion 28t located underneath yet adjacent to the U-shaped body portion 28u of the trim ring 28R. Each of the ends 28e and 28E of the U-shaped trim ring has an inner surface provided with hook members 28H which are adapted to have a sharp projection 28p imbedded and hooked into the covering of material such as a rubber provided on the outside of the hollow reinforcing member 28. Thus once the U-shaped body portion 28u of the trim ring 28R is applied to a covering over the reinforcing member 28, the trim ring is securely locked in place relative thereto due to the use of the hook member or teeth 28H having the projecting points 28p locked into engagement relative to the covering.

As is further visible in Fig. 7, the reinforcing member 28 is provided with opposite ends 28j and 28k which are preferably seam welded to each other around the entire peripherally inner edge of the annular body portion 26 of the steering wheel. Thus in effect there is a tear-drop shaped structure having a convex outer surface 28c and a concave inner surface 28A provided on opposite sides of the hollow support member 28. The opposite sides of the hollow support member 28 are separated radially relative to each other and are contoured so that the covering carried by the annular body portion of the steering wheel has a convex surface about the outer periphery adapted to be complementary to a palm of a hand and adapted to provide a concave inner surface relative to which fingers of an operator can be easily placed for maintaining a firm grip relative to the steering wheel and also adapted to provide a space in which a horn blowing mechanism can be disposed in accordance with the present invention.

Figure 8:
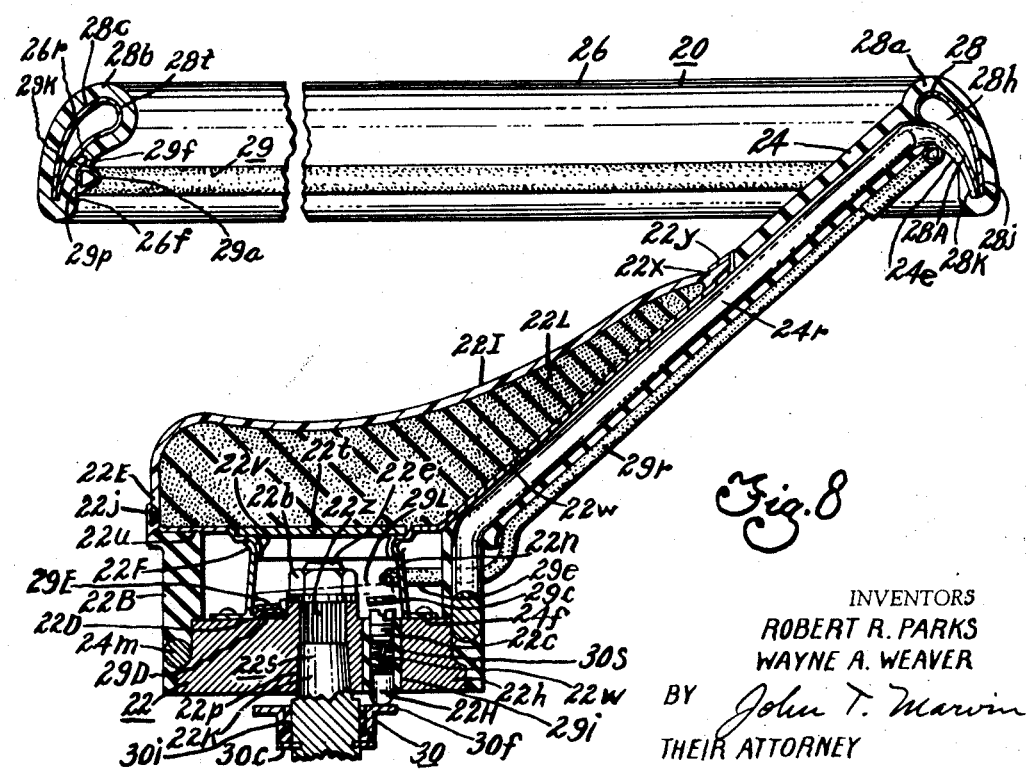
Figure 8 is a cross sectional view taken along line 8—8 of Fig. 6.

Referring particularly to Fig. 8, there is a cross sectional view taken along line 8—8 of Fig. 6 for illustrating a tubular means 29 having a flange portion 29f adapted to be inserted into a recess 26r in the steering wheel cover and having a locking means or key portion 29k complementary to a similar locking portion or key of the annular body portion of the steering wheel. The tubular means 29 is provided with a flat radial outer periphery 29p which is complementary to a flat surface 26f provided along a radially inner periphery of the annular body portion 26 of this steering wheel. The surface 29p and flange 29f may be cemented or bonded into firm engagement with the annular body portion 26 of the steering wheel. In any event, a semi-annular body portion 29a of the tubular means 29 protrudes radially inwardly from the annular body portion 26 of the steering wheel and is adapted to be squeezable by fingers of an operator as the fingers are curled around the top or bottom of the annular body portion of the steering wheel.

Also visible in Fig. 8 is one of the radial rods 24r provided within spoke 24 and having a hooked end portion 24e adapted to be complementary to the inner concave surface 28A of the hollow or tubular reinforcing means or ring 28. The rod 24r is preferably made of steel and end 24e of the rod is preferably welded to the radially inner peripheral surface of the tubular ring or reinforcing member 28. The tubular means 29 of the horn blowing mechanism has a radial extension 29r that is adapted to be inserted and carried relative to the spoke in a recess similar to the recess or groove 14g referred to in Fig. 4 in which wiring is imbedded along the under side of structure such as spoke 14. The radial portion 29r of the tubular means terminates adjacent to a hub member 22h having a central passage 22p through which a stud 22s of a steering column is inserted. The stud 22s has a splined portion 22z onto which the hub 22h is forced and is retained due to complementary splines provided along an inner periphery of the opening through the hub member 22h.

As visible in Fig. 8, the hub is further provided with a body 22B of insulating material which has a substantially annular structure in which the intermediate portion 24m of the reinforcing means for the spokes is imbedded and fitted into tight engagement relative to an outer periphery of the hub member 22h. The stud 22s is provided with a threaded outer end 22e onto which there is threaded a bolt 22b for retaining the hub 22h in engagement with a conical portion 22k or outer surface of the steering wheel shaft. Also carried by the hub is an annular spacing means 22n which extends from a flange 24f upwardly to an upper flange 22F onto which a metal plate 22u is attached. The plate 22u has a central opening surrounded by a radially outwardly protruding flange 22v which snaps into engagement with the flange 22F of the annular spacing means 22n. A cap or cover 22t is placed over the central opening of the cover 22u and is adapted to close off the opening through the cover member. The opening closed off by the cover 22t is provided for permitting access to the bolt 22b threaded onto the end of the steering column shaft as described earlier. The cover member 22u is provided with a laterally extending portion 22w that is substantially parallel to the support rod 24r in the spoke 24.

The cover member 22u provides a base for a padding or crash pad of sponge rubber or isocyanate 22L which is provided for protective purposes in the safety steering wheel of the present invention. A synthetic fabric or a leather covering 22I is provided over the top of the resilient or sponge rubber material 22L provided for padding the hub and a portion of the spokes of the steering wheel of the present invention. This covering 22I has one end portion 22E engaged against a projection 22j of the cover member 22u and an opposite end 22x hooked underneath a projection 22y bent extending over a top surface of an edge of the covering of leather or synthetic material 22I.

The foam material used as a crash pad covering the hub 22 of the steering wheel can also be a polystyrene rigid-foam material carried within the leather or imitation leather pad covering 22I. Thus an operator of a vehicle is protected against possible injury because the pad covering can effect absorption of at least a portion of a shock or impact that may be received by engagement of the operator relative to the steering wheel hub over the steering shaft. Also either the rod structure of the steering wheel of Fig. 1 or the hollow tubular structure of Fig. 8 can be collapsed due to impact for safety of the operator. Since a metal horn ring is not provided in space intermediate the hub 22 and annular body portion 26 of the steering wheel, the operator cannot be injured by such a metal horn ring. Also since no metal horn ring is used in the steering wheel and horn blowing mechanism of the present invention, there is no metallic surface which produces objectionable glare or which can obstruct the view of an operator of the vehicle. It is to be understood that the hub 12 of the steering wheel in Fig. 1 is provided with a padding of a resilient or foamed material just as is provided for the hub 22 in the steering wheel shown in Figures 6–8.

The horn blowing mechanism in the embodiment of the invention as illustrated in Figures 6–8 is provided with a fluid medium which is hermetically sealed with the confines of the annular tubular means 29 and radial portion 29r of the tubular means. The tubular means radial portion 29r has an end 29e located adjacent to the hub member 22h and terminating in a diaphragm portion 29D. The diaphragm portion is placed between a surface 22D of the hub and one end 29E of a lever 29L having a central body portion pivoted relative to the hub member 22h so that a contact portion 29c can be engaged against a contact portion or stud 22c which is connected by a wire 22w to a contact head 22H. The contact head portion 22H is spring biased relative to contact portion 22c and engages a top surface of a flange 30f of an annular contact member 30 carried concentrically relative to the steering column or shaft of the vehicle. An insulating sleeve 30i is provided and made of insulating material that separates the annular contact 30 from electrical engagement relative to the steering column. A snap ring or suitable flange means 30c is provided extending radially outwardly from the steering column or shaft and is adapted to retain the insulating sleeve 30i and annular conducting member 30 in position relative to the hub 22h and contact head portion 22H. Thus when the steering wheel is turned the contact head portion 22H can move about the annular top peripheral surface of the contact member 30 and a horn blowing connection is established whenever fluid sealed within the tubular means 29 is compressed and forced into the diaphragm portion 29D of the tubular means for pivoting the lever 29L into a position in which contact portion 29c of the lever 29L engages the contact stud 22c for closing an electrical circuit to blow the horn.

In Fig. 9 there is a schematic representation of the horn blowing mechanism in accordance with the embodiment of Figures 6–8. The lever 29L is shown having the one end 29E engaging the diaphragm 29D of the tubular means 29 and it is to be understood that whenever the tubular means 29 is compressed along its body portion 29a, fluid contained in sealed relationship within the tubular means is displaced from the annular tubular means about the concave undersurface of the body portion of the steering wheel and is used for actuation of the horn blowing mechanism. The fluid medium is displaced through the radial portion 29r into the end 29e of the tubular means and effects an expansion of the diaphragm end 29D of the tubular means which results in a lifting of the end 29E of the lever means 29L away from the surface 22D of the hub 22h. The lifting of the end 29E causes pivoting of the lever about an axis of a pin 30p supported by a bracket 30b suitably attached to the hub 22h. Preferably, a wire or insulating conductor 31 connected to ground at one end is connected at its opposite end to the bracket 30b and is used to establish an electrical connection by way of contact end 29c of the lever means 29L relative to the stud 22c which is threaded into engagement with an insulating sleeve 29i fitted through an opening extending away through the hub member 22h. A spring 30s is provided between one end of the contact 22c and an end of the head contact portion 22H and resiliently urges the head contact portion 22H into engagement with the flange 30f of the annular contact 30 provided around the steering column or shaft. The flange 30f of the contact 30 is connected by a suitably insulated wire 32 having a crimped end 32e protruding through an opening along a peripheral edge of the flange 30f at one end and extending to a battery 34 at an opposite end that in turn is connected through a conductor 35 leading to a coil or solenoid 36 connected to ground as indicated schematically in Fig. 9. The solenoid 36 is used for effecting mechanical vibration of suitable diaphragm means provided in a horn 36H mounted at a suitable location on a vehicle. The bracket 30b relative to which the lever 29L is pivoted is preferably insulated from the hub member 22h by means of an insulating plate 36i. Plate 36i and wire 31 can be eliminated by grounding bracket 30b directly to the hub. A torsion spring 36s can be provided for biasing the lever 29L to a contact open position by wrapping a central portion of the spring 36s around the shaft 30p relative to which the lever 29L is pivotable. One end 36E of the spring is fitted into a groove 36g provided along one side of the lever 29L and an opposite end 36e of the spring is fitted against a flange 30x of the bracket 30b.

Since the contact portion 22c is provided with a slot or groove 22G, the contact can be threaded into and out of engagement relative to internal threads of the insulating sleeve 29i and an adjustment can be made so that space between contact end 29c and the top or head of contact 22c is at a desired predetermined position to permit actuation of the horn blowing mechanism due to displacement of fluid from the body portion 29a of the tubular means 29 into the diaphragm portion 29D located underneath one end of the pivotable lever 29L.

In accordance with the present invention the wheel rim is provided with a reinforcing structure which is easily collapsible in the event there is an impact or collision causing an operator of a vehicle to be violently thrust against the steering wheel. Due to the foam padding provided relative to the hub and steering column of the vehicle, as well as due to the large peripheral and collapsible structure of the hollow or twin ring reinforcing means, there is a large contact surface to absorb shock when a person is thrown against the wheel. The upper half of the steering wheel is resilient and is easily collapsible in the event an operator's head comes into contact with the annular body portion or ring of the steering wheel. There is no metal horn ring provided in space intermediate the hub and steering wheel rim and therefore, danger of injury to an operator is completely eliminated so far as the metal horn ring is concerned.

It is noted that the trim ring 28R illustrated in Fig. 7 can be modified to include a pair of legs which are pivotally connected relative to each other and which are locked together by a separate U-shaped member or clamp complementary to the rim or annular body portion of the steering wheel. However, such a modification of the trim ring 28R is not a preferred embodiment and is not too practical when the horn blowing mechanism of the present invention is provided along a radially inner concave surface of the annular body portion of the steering wheel.

While the embodiments of the present invention as herein disclosed constitute a preferred form, it is to be understood that other forms might be adopted.

What is claimed is as follows:

1. A safety steering wheel, comprising, a hub portion, a rim portion including metal imbedded therein and shaped to provide a thicker and larger top section and a narrower bottom section interconnected by an inner concave surface, a pair of radially extending spoke portions interconnecting said hub portion and said rim portion, one of said spoke portions having a groove extending longitudinally thereof, tubular means adapted to be placed and attached relative to the inner concave surface and the groove of said one spoke portion, a horn blowing means including contact portions provided relative to said hub portion, said tubular means being compressible to effect horn blowing through closure of said contact portions, and a crash pad covering of relatively soft material for said hub portion, said crash pad covering and said tubular means for said steering wheel being non-metallic to avoid production of glare and being resilient and fitted to said steering wheel for safety to avoid obstruction to vision and to permit resilient movement of said rim portion in the event of impact of an operator against said steering wheel.

2. In combination, a horn blowing means and safety steering wheel, comprising, hub and rim means radially interconnected relative to each other and covered with resilient material including a substantially concave inner peripheral rim surface, a fluid-filled tubular means of resilient material secured in part along said inner rim surface and having a hub end into which fluid is forced by squeezing of said tubular means, a hub-mounted lever and contact means for horn blowing actuation when fluid is forced into said hub end by squeezing of said tubular means, and metal reinforcing means for said hub and rim means to support said tubular means and said resilient material such that horn-ring glare and obstruction to vision are eliminated.

3. The combination of claim 2 wherein said tubular means has a keyed flange portion extruded integrally therewith along a length remote from said hub end thereof, said keyed flange portion forming a surface complementary to the concave inner peripheral rim surface and a recess adapted for effecting locking engagement of said tubular means relative to said rim means.

4. The combination of claim 2 wherein said reinforcing means includes a hollow unitary metal member covered with resilient material and formed in a substantially tear-drop-shaped cross section having a convex outer periphery and a concave inner periphery adapted to be complementary to said fluid filled tubular means.

5. The safety steering wheel of claim 1 wherein said horn blowing means and contact portions provided relative to said hub portion include a lever portion having a movable contact end engageable electrically relative to a contact member mounted relative to said hub portion and adapted to be closed electrically relative to each other due to displacement of a fluid medium in said tubular means whereby said lever portion is pivotable relative to said hub portion and contact member.

6. A steering wheel, comprising a hub portion, a rim portion having an outer convex surface curved longitudinally and laterally in a radially outward direction and having a complementary substantially concave inner surface formed extending about an inner periphery of said rim portion, radially extending spoke portions interconnecting said hub portion and said rim portion, an annular deformable metal reinforcing means imbedded in said rim portion, said spoke portions being positively attached at radially outer ends directly to said reinforcing means along the concave inner surface, said reinforcing means having a semi-annular section remote from said spoke portions and adapted to be relatively collapsible and free and resilient relative to said spoke portions in the event of a severe impact or collision causing forward movement of an operator against the steering wheel, said rim portion including an annular relatively flat surface along a radially inner periphery thereof, and a tubular means having a flat outer periphery complementary to said flat surface and having a flange portion adapted to be fitted in complementary locking engagement relative to said rim portion.

References Cited in the file of this patent

UNITED STATES PATENTS

| | | |
|---|---|---|
| 595,898 | Whipple et al. | Dec. 21, 1897 |
| 1,076,091 | Allen | Oct. 21, 1913 |
| 1,826,278 | Flanigan | Oct. 6, 1931 |
| 1,943,915 | Geyer | Jan. 16, 1934 |
| 1,959,683 | Mitchell | May 22, 1934 |
| 2,575,926 | Murray | Nov. 20, 1951 |
| 2,784,006 | Dye et al. | Mar. 5, 1957 |
| 2,796,484 | Wolf | June 18, 1957 |
| 2,828,645 | Wilfert | Apr. 1, 1958 |
| 2,872,539 | Berner | Feb. 3, 1959 |

FOREIGN PATENTS

| | | |
|---|---|---|
| 429,308 | Germany | May 25, 1926 |